(12) United States Patent
Petniunas et al.

(10) Patent No.: US 12,515,551 B2
(45) Date of Patent: Jan. 6, 2026

(54) SYSTEMS AND METHODS FOR CONTROLLING NOISE EMISSION LEVELS WHILE CHARGING ELECTRIFIED VEHICLES

(71) Applicant: FORD GLOBAL TECHNOLOGIES, LLC, Dearborn, MI (US)

(72) Inventors: Alexander Petniunas, Canton, MI (US); Mark Lynn Clapper, Ann Arbor, MI (US); Jason Peter Konopa, Clawson, MI (US); William David Rauch, Pleasant Ridge, MI (US); Ralph Robert Jones, Tecumseh (CA); Kevin Zenkai Chow, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 280 days.

(21) Appl. No.: 18/300,536

(22) Filed: Apr. 14, 2023

(65) Prior Publication Data
US 2024/0343148 A1    Oct. 17, 2024

(51) Int. Cl.
*B60L 53/62* (2019.01)
*B60L 58/10* (2019.01)
*B60L 58/12* (2019.01)

(52) U.S. Cl.
CPC .............. *B60L 53/62* (2019.02); *B60L 58/10* (2019.02); *B60L 58/12* (2019.02); *B60L 2270/14* (2013.01)

(58) Field of Classification Search
None
See application file for complete search history.

(56) References Cited

U.S. PATENT DOCUMENTS

| | | | | |
|---|---|---|---|---|
| 7,222,004 | B2* | 5/2007 | Anderson | G01C 21/3461 180/65.265 |
| 8,224,500 | B2* | 7/2012 | Anderson | G05D 1/0088 701/1 |
| 10,144,295 | B2* | 12/2018 | Ghebru | H02J 7/00047 |
| 10,486,689 | B2 | 11/2019 | Farrell et al. | |
| 2006/0173593 | A1* | 8/2006 | Anderson | G01C 21/3461 701/1 |
| 2018/0170349 | A1* | 6/2018 | Jobson | B60L 7/18 |
| 2018/0290555 | A1* | 10/2018 | Zoon | H02J 7/007 |
| 2019/0047572 | A1* | 2/2019 | Bennett | B60K 6/46 |
| 2023/0170723 | A1* | 6/2023 | Wisbrun | B60L 53/66 320/109 |
| 2023/0256864 | A1* | 8/2023 | Ogaki | B60H 1/00964 701/22 |
| 2024/0123854 | A1* | 4/2024 | Kobayashi | B60L 3/0069 |
| 2024/0266637 | A1* | 8/2024 | Hirokawa | H01M 10/625 |

FOREIGN PATENT DOCUMENTS

| | | |
|---|---|---|
| DE | 102018204992 A1 | 10/2019 |
| WO | 2021213889 A1 | 10/2021 |

* cited by examiner

*Primary Examiner* — Peter D Nolan
*Assistant Examiner* — Jacob Kent Besteman-Street
(74) *Attorney, Agent, or Firm* — David B. Kelley; Carlson, Gaskey & Olds, P.C.

(57) ABSTRACT

Charging control systems and methods are provided for controlling noise emission levels when charging an electrified vehicle. The nose emission levels may be controlled based on one or more user-defined rules associated with a custom quiet zone. The charging control systems may include one or more user interfaces designed to allow users to establish the user-defined rules which bound the custom quiet zone.

20 Claims, 6 Drawing Sheets

SYSTEMS AND METHODS FOR CONTROLLING NOISE EMISSION LEVELS WHILE CHARGING ELECTRIFIED VEHICLES

TECHNICAL FIELD

This disclosure relates generally to electrified vehicles, and more particularly to systems and methods for controlling noise emission levels when charging electrified vehicles.

BACKGROUND

A traction battery pack typically powers an electric machine and other electrical loads of an electrified vehicle. The traction battery pack includes a plurality of battery cells that must be periodically charged to replenish the energy necessary to power these loads. Some vehicle components produce noise when charging the electrified vehicle.

SUMMARY

A charging control system for an electrified vehicle according to an exemplary aspect of the present disclosure includes, among other things, a traction battery pack, and a control module programmed to selectively control charging of the traction battery pack in a quiet charging mode when the electrified vehicle is located in a user-defined custom quiet zone.

In a further non-limiting embodiment of the foregoing charging control system, the user-defined custom quiet zone identifies a location where the quiet charging mode should be performed.

In a further non-limiting embodiment of either of the foregoing charging control systems, the user-defined custom quiet zone identifies a day of a week and a time of the day when the quiet charging mode should be performed.

In a further non-limiting embodiment of any of the foregoing charging control systems, the user-defined custom quiet zone identifies a loudness tolerance that will be permitted while charging the traction battery pack during the quiet charging mode.

In a further non-limiting embodiment of any of the foregoing charging control systems, the user-defined quiet zone is derived from information that is input into a user interface that is operably connected to the control module.

In a further non-limiting embodiment of any of the foregoing charging control systems, the control module is further programmed to compute a noise emission level limit of the electrified vehicle based at least on the user-defined custom quiet zone.

In a further non-limiting embodiment of any of the foregoing charging control systems, the control module is further programmed to compute an operating speed limit of a sound generating component of the electrified vehicle based at least on the noise emission level limit.

In a further non-limiting embodiment of any of the foregoing charging control systems, the control module is further programmed to determine whether the operating speed limit is sufficient to meet a waste heat dissipation requirement of the traction battery pack.

In a further non-limiting embodiment of any of the foregoing charging control systems, the control module is further programmed to modify a target charging rate of the traction battery pack when the operating speed limit is not sufficient to meet the waste heat dissipation requirement of the traction battery pack.

In a further non-limiting embodiment of any of the foregoing charging control systems, the control module is further programmed to select a target charging rate for charging the traction battery pack from a look-up table based at least on the noise emission level limit.

In a further non-limiting embodiment of any of the foregoing charging control systems, the control module is further programmed to communicate a target charging rate command signal to a battery charge control module (BCCM) of the charging control system.

A charging control system for an electrified vehicle according to another exemplary aspect of the present disclosure includes, among other things, a traction battery pack, and a control module programmed to command a reduced charging rate for charging the traction battery pack when a noise emission level expected to be emitted by the electrified vehicle during a charging event will exceed a noise emission level limit. The noise emission level limit is at least partially derived from a user-defined loudness tolerance.

In a further non-limiting embodiment of the foregoing charging control system, the control module is programmed to command a battery charge control module (BCCM) of the charging control system to apply the reduced charging rate during the charging event.

In a further non-limiting embodiment of either of the foregoing charging control systems, the user-defined loudness tolerance is a rule associated with a custom quiet zone.

In a further non-limiting embodiment of any of the foregoing charging control systems, the user-defined loudness tolerance is derived from information that is input into a user interface that is operably connected to the control module.

In a further non-limiting embodiment of any of the foregoing charging control systems, the control module is further programmed to compute an operating speed limit of a sound generating component of the electrified vehicle based at least on the noise emission level limit.

In a further non-limiting embodiment of any of the foregoing charging control systems, the control module is further programmed to determine whether the operating speed limit is sufficient to meet a waste heat dissipation requirement of the traction battery pack.

In a further non-limiting embodiment of any of the foregoing charging control systems, the control module is further programmed to reduce the charging rate when the operating speed limit is not sufficient to meet the waste heat dissipation requirement of the traction battery pack.

A method according to another exemplary aspect of the present disclosure includes, among other things, controlling charging of a traction battery pack of an electrified vehicle in a quiet charging mode when the electrified vehicle is located in a user-defined custom quiet zone. The controlling is performed by a control module of a charging control system of the electrified vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes charging control systems and methods for controlling noise emission levels when charging an electrified vehicle. The nose emission levels may be controlled based on one or more user-defined rules associated with a custom quiet zone. The charging control systems may include one or more user interfaces designed to allow users to establish the user-defined rules which bound the custom quiet zone. These and other features of this disclosure are discussed in greater detail in the following paragraphs of this detailed description.

Figure 1:
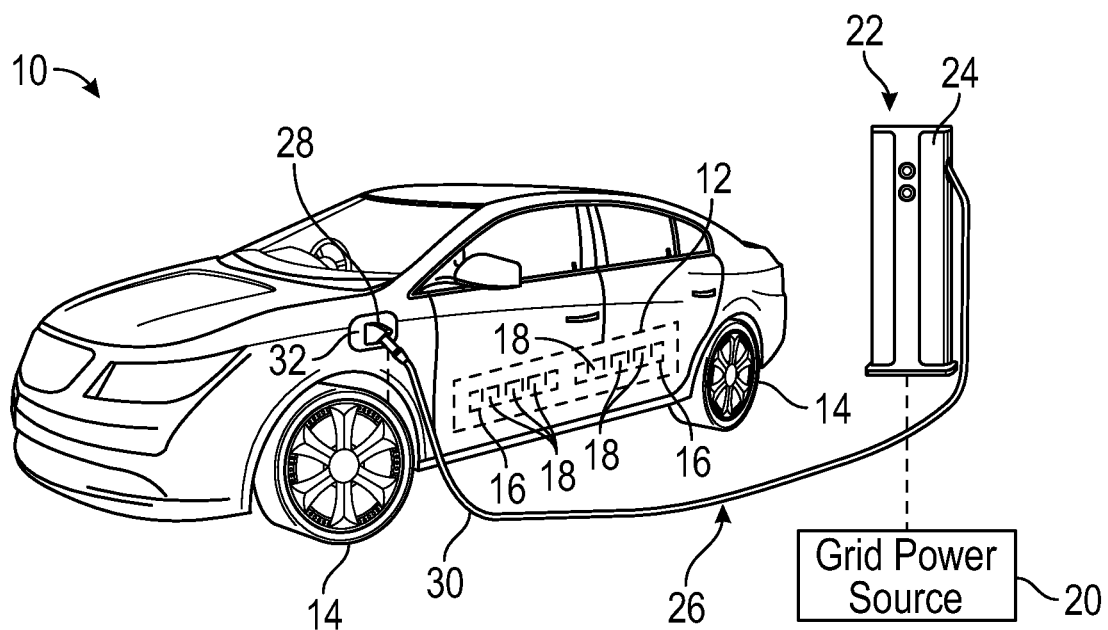
FIG. 1 schematically illustrates an electrified vehicle during a charging event.

FIG. 1 illustrates an exemplary electrified vehicle 10 that includes a traction battery pack 12. The electrified vehicle 10 may include any electrified powertrain capable of applying a torque from an electric machine for providing motive power for driving drive wheels 14 (or other traction devices) of the electrified vehicle 10. In an embodiment, the electrified vehicle 10 is a plug-in hybrid electric vehicle (PHEV). In another embodiment, the electrified vehicle is a battery electric vehicle (BEV). Therefore, the powertrain of the electrified vehicle 10 may electrically propel the drive wheels 14 either with or without the assistance of an internal combustion engine.

The electrified vehicle 10 of FIG. 1 is schematically illustrated as a sedan-style car. However, the teachings of this disclosure may be applicable to any type of vehicle, including but not limited to, cars, trucks, vans, sport utility vehicles (SUVs), airplanes, boats, buses, drones, etc.

Although shown schematically, the traction battery pack 12 may be a high voltage traction battery pack that includes a plurality of battery arrays 16 (e.g., groupings of battery cells 18) capable of outputting electrical power to one or more electric machines (e.g., electric motors) of the electrified vehicle 10. In an embodiment, the battery cells 18 are lithium-ion battery cells. However, other types of energy storage devices and/or output devices could be used to electrically power the electrified vehicle 10.

The battery cells 18 of the traction battery pack 12 may periodically require charging for replenishing their energy levels. The electrified vehicle 10 may therefore interface with a grid power source 20 (e.g., AC power, solar power, wind power, or combinations thereof) through an electric vehicle supply equipment (EVSE) system 22 in order to transfer energy from the grid power source 20 to the electrified vehicle 10 for charging the traction battery pack 12.

The EVSE system 22 may include an EVSE housing 24 and a charge cord assembly 26. The EVSE housing 24 may be configured as a wall box, a charging station stanchion, etc. The specific configuration of the EVSE housing 24 is not intended to limit this disclosure. The EVSE housing 24 may include the necessary equipment (e.g., relays, human machine interfaces, etc.) for coordinating the transfer of energy between the electrified vehicle 10 and the grid power source 20.

The charge cord assembly 26 may include a charge coupler 28 and a cable 30. The cable 30 may be connected at one end to the charge coupler 28 and at an opposite end to the EVSE housing 24. The charge coupler 28 may be coupled (e.g., plugged-in) to a charge port assembly 32 (sometimes referred to as a vehicle inlet assembly) of the electrified vehicle 10 in order to transfer energy from the grid power source 20 to the electrified vehicle 10.

In an embodiment, the charge coupler 28 is configured to plug into an SAE J1772 type charge port assembly 32. However, other charge coupler/charge port configurations are further contemplated within the scope of this disclosure. The specific configurations of the charge coupler 28 and the charge port assembly 32 are therefore not intended to limit this disclosure.

The EVSE system 22 and the electrified vehicle 10 may be configured to provide any level of charging (e.g., Level 1 AC charging, Level 2 AC charging, DC fast charging, etc.). In general, Level 1 charging refers to charging events in which power levels of less than about 2.4 kW are delivered for charging the battery cells 18 of the traction battery pack 12, and Level 2 charging refers to charging events in which power levels of between about 3 kW and about 20 kW are delivered for charging the battery cells 18 of the traction battery pack 12. Both Level 1 and Level 2 charging are typically delivered using an onboard power conversion module that is adapted to convert AC inputs to DC outputs that can be accepted by the traction battery pack 12. DC fast charging refers to charging events in which power levels of about 50 kW or more are delivered for rapidly charging the battery cells 18 of the traction battery pack 12. In this disclosure, the term "about" means that the expressed quantities or ranges need not be exact but may be approximated and/or larger or smaller, reflecting acceptable tolerances, conversion factors, measurement error, etc.

The term "charging rate" refers to the speed at which the traction battery pack 12 can accept charging current during a charging event. In general, higher charging rates create larger amounts of waste heat within the traction battery pack 12 compared to lower charging rates. This waste heat typically must be dissipated by operating vehicle sound generating components such as electric cooling fans, electronic AC compressor, circulation pumps, electronic refrigerant pumps, charge conversion electronics that accept AC line voltage from the EVSE system 22 and convert the AC line voltage to DC line voltage that can be accepted by the traction battery pack 12, etc. However, operating these sound generating components at the higher speeds necessary to dissipate the waste heat generates a greater level of noise emission from the electrified vehicle 10. Therefore, there is a trade-off between charging rate and noise emission during vehicle charging events.

In certain residential areas or other locales, quiet zones can exist that attempt to limit the effects of noise pollution on nearby people/buildings/areas of interest. Users may be unaware of relevant noise ordinances associated with quiet zones when charging their vehicles. Further, users may not fully understand that charging rate can influence noise emission levels. This disclosure is therefore directed to charging control systems and methods that include features for allowing a user to specifically select a compromise between charging rate and noise emission levels when charging the electrified vehicle 10.

Figure 2:
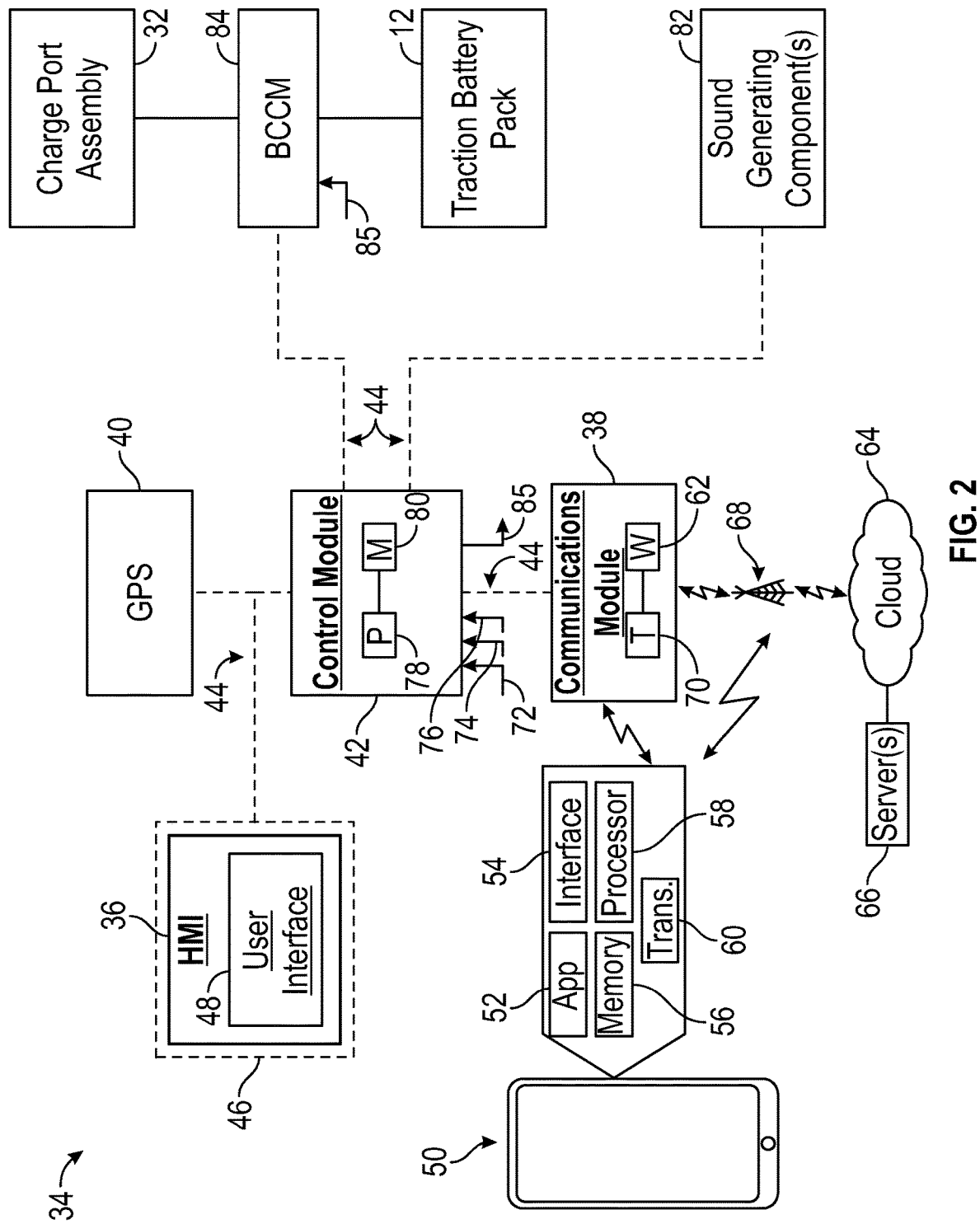
FIG. 2 schematically illustrates an exemplary charging control system for an electrified vehicle.

FIG. 2, without continued reference to FIG. 1, is a highly schematic depiction of a charging control system 34 of the electrified vehicle 10. The charging control system 34 may be configured control the electrified vehicle 10 in a quiet charging mode when charging the traction battery pack 12. As further explained below, the charging control system 34 may provide a user with the ability to select a compromise between charging rate and noise emission levels when charging the electrified vehicle 10.

The charging control system 34 may include a human machine interface (HMI) 36, a communications module 38, a global positioning system (GPS) 40, and a control module 42. These and other components may be interconnected and in electronic communication with one another over one or more communication buses 44. The communication buses 44 may be wired communication buses such as a controller area network (CAN) bus, or a wireless communication buses such as Wi-Fi, Bluetooth®, Ultra-Wide Band (UWB), etc.

The HMI 36 may be located within a passenger cabin 46 of the electrified vehicle 10 and may include various user interfaces for displaying information to the vehicle occupants and for allowing the vehicle occupants to enter information into the HMI 36. The vehicle occupants may interact with the user interfaces via touch screens, tactile buttons, audible speech, speech synthesis, gesture recognition, etc. In an embodiment, the HMI 36 is part of an in-dash infotainment system of the electrified vehicle 10. However, other configurations are further contemplated within the scope of this disclosure.

The HMI 36 may include one or more user interfaces 48 dedicated to functionality associated with the charging control system 34. One or more of the user interfaces 48 may specifically relate to the quiet charging mode of the charging control system 34. The user interfaces 48 may present charging-related information to a user. Non-limiting examples of the type of charging-related information that may be displayed within the user interfaces 48 include but are not limited to identification of nearby quiet zones, current charging rate, time to 80% charge, etc.

The vehicle user could alternatively or additionally interface with the charging control system 34 with a personal electronic device 50 (e.g., a smart phone, tablet, computer, wearable smart device, etc.). The personal electronic device 50 in most implementations belongs to the owner/user of the electrified vehicle 10. The personal electronic device 50 may include an application 52 (e.g., FordPass™ or another similar application) that includes programming to allow the user to employ one or more user interfaces 54 for setting or controlling certain aspects of the charging control system 34. Charging-related information may be presented to the user within one or more of the user interfaces 54. The application 52 may be stored in a memory 56 of the personal electronic device 50 and may be executed by a processor 58 of the personal electronic device 50. The personal electronic device 50 may additionally include a transceiver 60 that is configured to communicate with the charging control system 34, such as via the communications module 38, for example.

The communications module 38 may be configured for achieving bidirectional communications between the charging control system 34 and the personal electronic device 50. For example, the communications module 38 may include one or more wireless devices 62 that facilitate communications between the user and the charging control system 34. The wireless devices 62 may be imbedded or otherwise mounted at various locations of the electrified vehicle 10, such as within the front bumper, rack, molding, doors, in-vehicle components, etc. In an embodiment, the wireless devices 62 are Bluetooth® Low Energy (BLE) transceivers configured to receive and/or emit low energy signals as a way to detect and communicate with participating users. However, other types of wireless devices (e.g., WiFi, V2V, UWB, Cellular, etc.) are also contemplated within the scope of this disclosure.

The communications module 38, and the personal electronic device 50, may be further configured to communicate over a cloud network 64 (i.e., the internet) to obtain various information stored on one or more servers 66. Each server 66 can identify, collect, and store user data associated with the electrified vehicle 10 for validation purposes. Upon an authorized request, data may be subsequently transmitted to the communications module 38, such as via a cellular tower 68 or some other known communication technique (e.g., Wi-Fi, Bluetooth®, etc.). The communications module 38 may include a transceiver 70 for achieving bidirectional communications with the cellular tower 68. For example, the transceiver 70 can receive data from the servers 66 or can communicate data back to the servers 66 via the cellular tower 68. Although not necessarily shown or described in this highly schematic embodiment, numerous other components may enable bidirectional communications between the electrified vehicle 10 and the web-based servers 66.

In an embodiment, the communications module 38 communicates with the servers 66 to obtain user information 72 (e.g., location history, mode selection history, user settings history, custom noise restriction limits, etc.), noise restriction information 74 (e.g., local noise ordinance information, various times, locations, and acceptable noise levels associated with each specific time and location, etc.), etc. The data received by the communications module 38 from the servers 66 may be communicated to the control module 42 where it can be used in combination with other data for executing the quiet charging mode in an effort to balance charging rate with noise emission levels when charging the electrified vehicle 10. This may be especially important when charging the electrified vehicle 10 while it is located in a designated quiet zone.

The GPS 40 is configured to pinpoint locational coordinates of the electrified vehicle 10. The GPS 40 may utilize geopositioning techniques or any other satellite navigation techniques for estimating the geographic position of the electrified vehicle 10 at any point in time. GPS data 76 from the GPS 40 may be used to determine, among other things, the noise restriction information that is most relevant to the electrified vehicle 10 for any given charging event.

The control module 42 may include both hardware and software and could be part of an overall vehicle control system, such as a vehicle system controller (VSC), or could alternatively be a stand-alone controller separate from the VSC. In an embodiment, the control module 42 is programmed with executable instructions for interfacing with and commanding operation of various components of the charging control system 34 as part of a control strategy for executing the quiet charging mode. Although shown as separate modules within the highly schematic depiction of FIG. 2, the HMI 36, the communications module 38, the GPS 40, and the control module 42 could be integrated together as part of common module of the electrified vehicle 10.

The control module 42 may include a processor 78 and non-transitory memory 80 for executing various control strategies and modes associated with the charging control system 34. The processor 78 may be a custom made or commercially available processor, a central processing unit (CPU), or generally any device for executing software instructions. The memory 80 may include any one or combination of volatile memory elements and/or nonvolatile memory elements. The processor 78 may be operably coupled to the memory 80 and may be configured to execute one or more programs stored in the memory 80 of the control module 42 based on the various inputs received from other devices associated with the charging control system 34.

In an embodiment, the control module 42 may be programmed to determine a noise emission level limit of the electrified vehicle 10 during a given charging event. The noise emission level limit represents the maximum amount of noise (e.g., in decibels A (dBA)) that will be tolerated to be emitted from the electrified vehicle 10 during the charging event. The noise emission level limit may be inferred based on the GPS data 76 (e.g., current location of the electrified vehicle 10, time of day, day of week, etc.), the noise restriction information 74 received from the servers 66, and the user information 72 (e.g., user specified noise limit selections, customized quiet zone designations, etc.) received from the HMI 36 and/or the personal electronic device 50. The control module 42 may determine the noise emission level limit each time the charge coupler 28 of the charge cord assembly 26 is plugged into the charge port assembly 32 or when it is otherwise inferred that a charging event is about to occur, for example.

The control module 42 may be further programmed to calculate an operating speed limit (e.g., in revolutions per minute (RPM)) of one or more sound generating components 82 of the electrified vehicle 10 that must be operated in order to dissipate the waste heat generated by the traction battery pack 12 when charging the electrified vehicle 10 at a desired charging rate. The operating speed limit of each sound generating component 82 may be derived as a function of various factors, including but not limited to ambient temperature, battery cell temperatures, state of charge (SOC) of the traction battery pack 12, etc. Although shown schematically, the sound generating components 82 may include one or more of an electric cooling fan, an electronic AC compressor, a circulation pump, an electronic refrigerant pump, charge conversion electronics, etc.

In an alternative implementation, the operating speed limit of the one or more sound generating components 82, and a matching charging rate required to achieve the noise emission level limit, may be derived from one or more look-up tables. The look-up tables may be predefined, multi-axis tables that are stored in the memory of the control module 42.

The control module 42 may be further programmed to command (e.g., via a target charging rate command signal 85) a battery charge control module (BCCM) 84 to modify the charging rate utilized to charge the traction battery pack 12 during the charging event when the operating speed limits of the sound generating components 82 are estimated to be insufficient to meet the waste heat dissipation requirements of the traction battery pack 12.

The control module 42 may be further programmed to optimize the charging rate during the charging event. This may include employing one or more optimization algorithms (e.g., Euler, steepest descent, etc.) for continuously incrementing/decrementing the charging rate during the charging event.

The control module 42 may also be configured to command that one or more alerts be communicated to the user/owner of the electrified vehicle 10 when it is necessary to modify the charging rate. The alerts may take the form of one or more messages that can be displayed on the HMI 36 and/or the personal electronic device 50, for example.

In the embodiments described above, the control module 42 of the electrified vehicle 10 may be configured to function as the communications hub of the charging control system 34. However, other embodiments are also contemplated within the scope of this disclosure. For example, one or more control modules of the servers 66 (e.g., a cloud-based control module) could be configured to function as the communications hub of the charging control system 34. In yet another embodiment, the respective control modules of each of the electrified vehicle 10 and the servers 66 may operate together over the cloud network 64 to establish a control system for controlling the functionality of the charging control system 34, such as for executing the quiet charging mode, for example.

Figure 3:
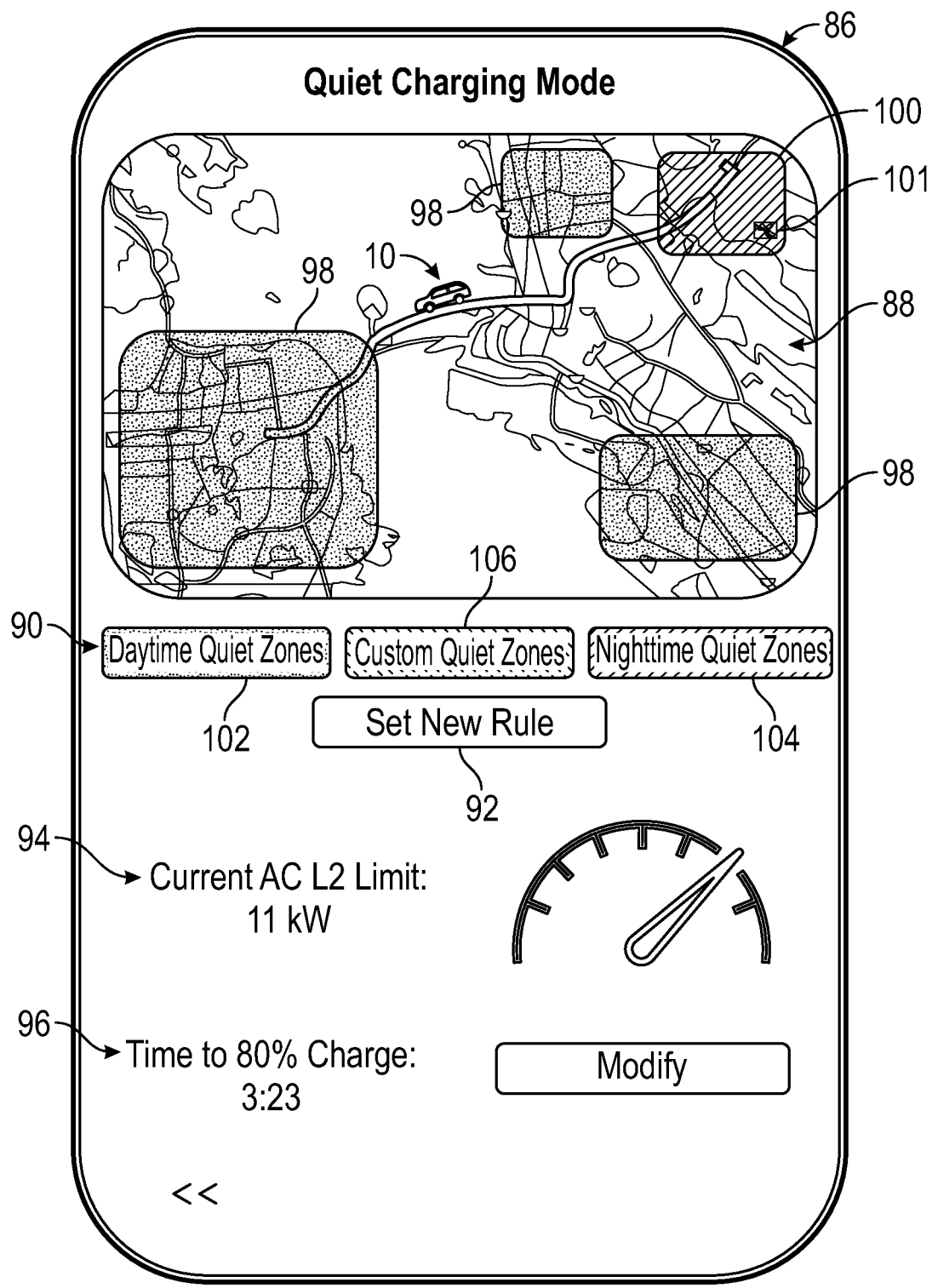
FIG. 3 schematically illustrates a quiet charging mode user interface.

An exemplary user interface 86 that can be presented to the user on the HMI 36 and/or the personal electronic device 50 for setting/controlling certain aspects associated with the quiet charging mode of the charging control system 34 is schematically illustrated in FIG. 3. The user interface 86 may include, among other things, a map 88, a legend 90, a new rule button 92, a current charging rate limit indicator 94, and a time to 80% charge indicator 96. Various other information/prompts/buttons may be presented to the user within the user interface 86 within the scope of this disclosure The map 88 may present various information to the user such as current location of the electrified vehicle 10 and normal daily route. Daytime quiet zones 98 and nighttime quiet zones 100 may also be indicated on the map 88. The map 88 may further identify one or more custom quiet zones 101 that have been previously set by the user. Other implementations of the map 88 are possible within the scope of this disclosure The legend 90 may include one or more symbols that allow the user to interpret the map 88. In the illustrated embodiment, the legend includes a first symbol 102 for indicating the daytime quiet zones 98, a second symbol 104 for indicating the nighttime quiet zones 100, and a third symbol 106 for indicating the custom quiet zones. Other implementations of the legend 90 are possible within the scope of this disclosure.

The new rule button 92 may be pressed to allow the user to define a custom quiet zone. The newly defined custom quiet zone may be bound by location, time of day, day of week, loudness, etc.

The user interface 86 may also present various charging-related information to the user. For example, the current charging rate limit indictor 94 may present information such as the current charging rate limit (e.g., in kW) of the traction battery pack 12 to the user, and the time to 80% charge indicator 96 may indicate how long (e.g., in hours and minutes) it is expected to take to charge the traction battery pack 12 to 80% SOC under current charging conditions.

The configuration of the user interface 86 shown in FIG. 3 is considered exemplary and is therefore not intended to limit this disclosure. Various other information, prompts, buttons, fields, etc. could be presented to the user within the user interface 86 within the scope of this disclosure.

Figure 4:
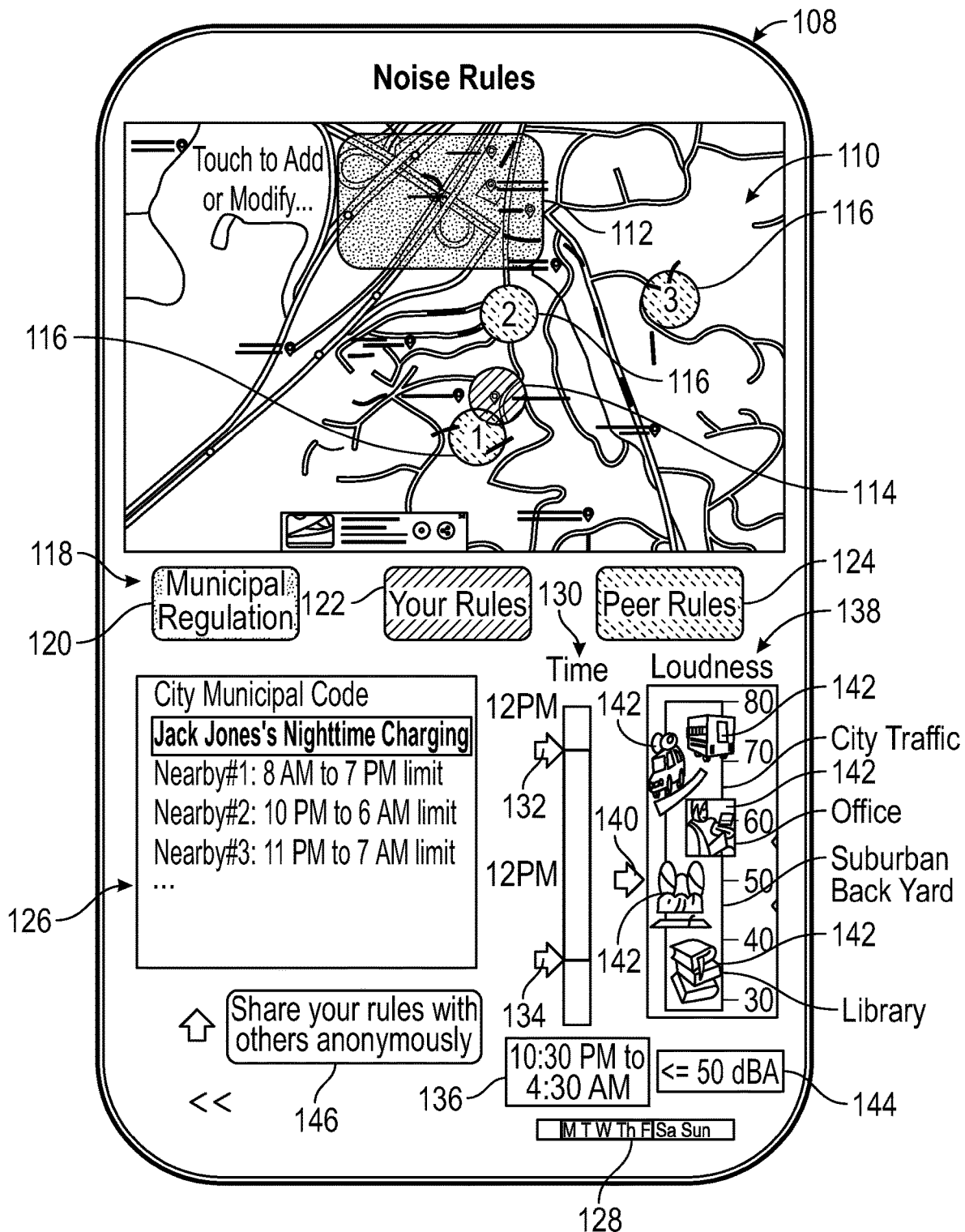
FIG. 4 schematically illustrates another exemplary quiet charging mode user interface.

Another exemplary user interface 108 that can be presented to the user on the HMI 36 and/or the personal electronic device 50 for setting/controlling certain aspects associated with the quiet charging mode of the charging control system 34 is schematically illustrated in FIG. 4. In an embodiment, the user interface 108 is a subscreen of the user interface 86 that may be accessed by pressing the new rule button 92 of the user interface 86. The user interface 108 may therefore provide the user with the ability to establish or modify custom quiet zones and the various noise-related rules associated with them.

The user interface 108 may include a map 110 that presents various information to the user. The map 110 may be touch sensitive to allow a user to touch the map 110 in order to add a new custom quiet zone or modify an existing one. Quiet zones 112 established by municipal regulations, first custom quiet zones 114 established by the user of the electrified vehicle 10, and second custom quiet zones 116 established by other electrified vehicle owners may each be indicated on the map 110. Other implementations of the map 110 are possible within the scope of this disclosure The user interface 108 may include a legend 118 for interpreting the map 110. The legend 118 may include one or more symbols that allow the user to interpret the map 110. In the illustrated embodiment, the legend 118 includes a first symbol 120 for indicating the quiet zones 112, a second symbol 122 for indicating the first custom quiet zones 114, and a third symbol 124 for indicating the second custom quiet zones 116. Other implementations of the legend 118 are possible within the scope of this disclosure.

The user interface 108 may further include a quiet zone listing field 126 that lists all the quiet zones that are in effect within a predefined distance from a current location of the electrified vehicle 10. The user can toggle between the various quiet zones within the quiet zone listing field 126. The user can also delete one or more quiet zones, such as by performing a left-swipe from within the quiet zone listing field 126.

Each quiet zone indicated within the user interface 108 may have one or more noise-related rules associated with it. For example, each quiet zone may be defined by at least location (e.g., where the rule applies), day of week and time of day (e.g., when the rules applies), and loudness (e.g., how much loudness is allowed when charging within the subject custom quiet zone). For the first custom quiet zones 114, the user may specifically select the where, when and loudness level rules that will govern each first custom quiet zone 114.

The map 110 may be used to define the location associated with each first custom quiet zone 114. A day of the week field 128 may be used to select/deselect which days the rules associated with each first custom quiet zone 114 will apply.

A time bar 130 may be used to select when the rules associated with each first custom quiet zone 114 will start and end on each selected day. A begin pointer 132 may be dragged along a length of the time bar 130 to set the start time, and an end pointer 134 may be dragged along the length of the time bar 130 to set the end time. The start and end times may be visually indicated in a time of day field 136 of the user interface 108.

A loudness bar 138 may be used to select the amount of loudness that will be permitted when charging the electrified vehicle 10 when located within each first custom quiet zone 114. A loudness pointer 140 may be dragged along a length of the loudness bar 138 to set the loudness tolerance. The loudness bar 138 may include various symbols 142 for visually distinguishing between levels of loudness. The differing levels of loudness indicated by the symbols 142 can be defined in terms of common customer experiences (e.g., library, suburban back yard, office, city traffic, etc.), The user selected value of the loudness tolerance may be visually indicated in a loudness selection field 144 of the user interface 108.

The user interface 108 may additionally include a share button 146. The share button 146 may be pressed to allow the user to anonymously share one or more of the first custom quiet zones 114 with other users that are connected over a common cloud-based application. This could be beneficial both for building a database of noise sensitive areas and for increasing customer awareness of other noise sensitive users.

The configuration of the user interface 108 shown in FIG. 4 is considered exemplary and is therefore not intended to limit this disclosure. Various other information, prompts, fields, buttons, etc. could be presented to the user within the user interface 108 for defining a custom quiet zone within the scope of this disclosure.

Figure 5:
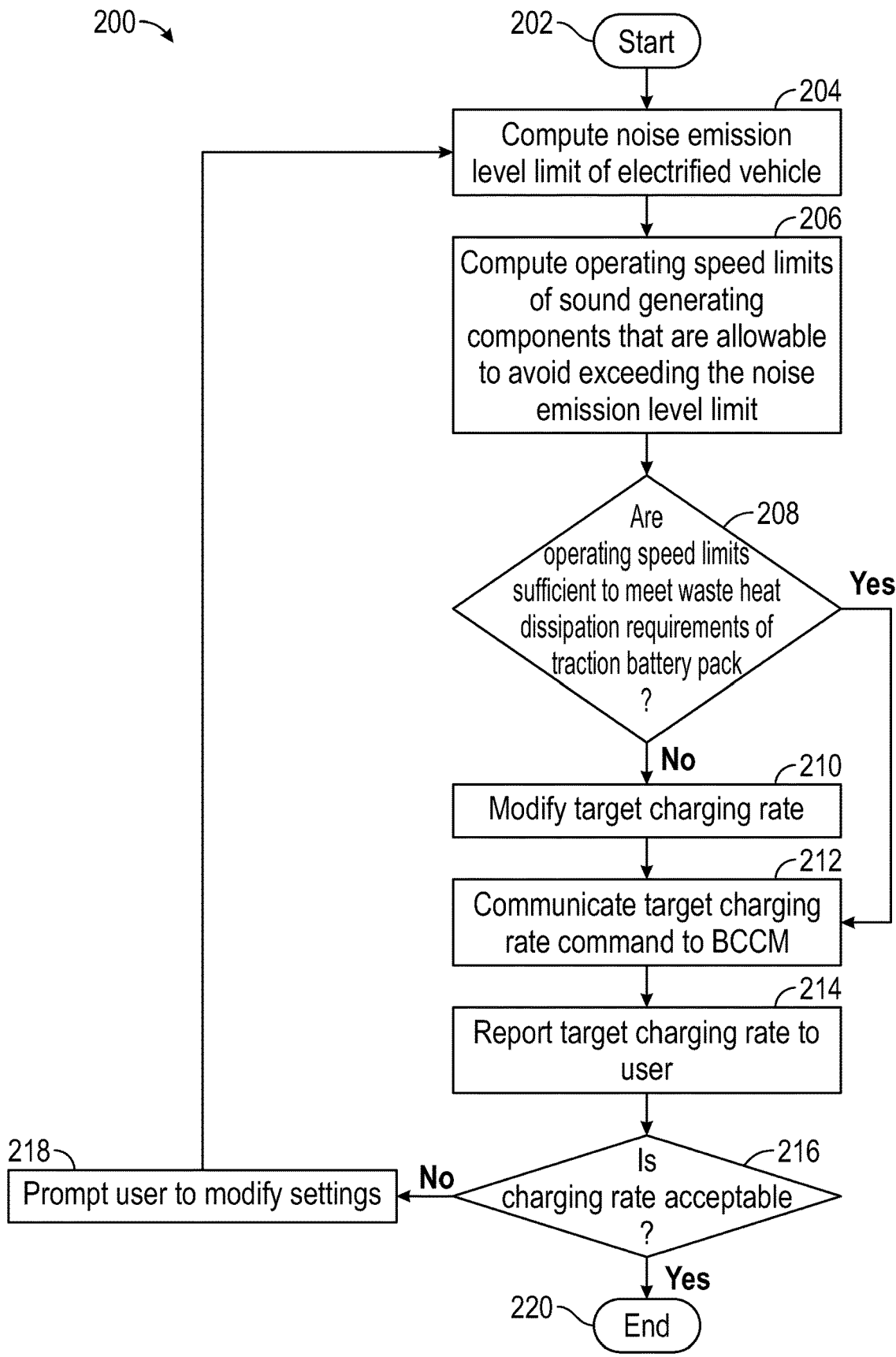
FIG. 5 schematically illustrates an exemplary method for controlling an electrified vehicle in a quiet charging mode for reducing noise emission levels during a charging event.

FIG. 5, with continued reference to FIGS. 1-4, schematically illustrates an exemplary method 200 for controlling noise emission levels (e.g., by executing the quiet charging mode) when charging the electrified vehicle 10. The method 200 may include a greater or fewer number of steps than recited below, and the exact order of the steps is not intended to limit this disclosure. The charging control system 34 may be configured to employ one or more algorithms adapted to execute at least a portion of the steps of the exemplary method 200. For example, the method 200 may be stored as executable instructions in the memory 80 of the control module 42, and the executable instructions may be embodied within any computer readable medium that can be executed by the processor 78 of the control module 42.

The method 200 may begin at block 202. Notably, the method 200 assumes that the electrified vehicle 10 is located within a designated quiet zone and that a charging event has been confirmed or has been inferred as being likely to soon occur.

At block 204, the method 200 may compute the noise emission level limit of the electrified vehicle 10 that is desired during the charging event. In an embodiment, the noise emission level limit may be derived based on the GPS data 76 (e.g., current location of the electrified vehicle 10, time of day, day of week, etc.), the noise restriction information 74 received from the servers 66, and the user information 72 (e.g., user specified noise limit selections, customized quiet zone designations, etc.) received from the HMI 36 and/or the personal electronic device 50. In an embodiment, the user information 72 received by the control module 42 may be at least partially derived from data that is entered within the user interfaces 86, 108.

Next, a block 206, the method 200 may compute the operating speed limits at which the sound generating components 82 of the electrified vehicle 10 can be operated without exceeding the noise emission level limit. The operating speed limit of each sound generating component 82 may be derived as a function of various factors, including but not limited to ambient temperature, battery cell temperatures, state of charge (SOC) of the traction battery pack 12, etc.

The method 200 may next proceed to block 208. At this step, the method 200 may determine whether the computed operating speeds of the sound generating components 82 are sufficient to meet the waste heat dissipation requirements of the traction battery pack 12 at the current charging rate. If a NO flag is returned at block 208, the method 200 may modify the target charging rate at block 210 and then communicate a target charging rate command to the BCCM 84 at block 212. Alternatively, if a YES flag is returned at block 208, the method 200 may proceed directly to block 212 by communicating the target charging rate command to the BCCM 84.

At block 214, the method 200 may report the target charging rate to the user. This may be in the form of one or more messages that may be presented on the HMI 36 and/or the personal electronic device 50.

The method 200 may next proceed to block 216 by prompting the user to confirm that the target charging rate is acceptable. If NO, the method 200 may prompt the user to modify the quiet zone mode settings at block 218. The method 200 may then return to block 204. Alternatively, if a YES flag is returned at block 216, the method 200 may end at block 220.

Figure 6:
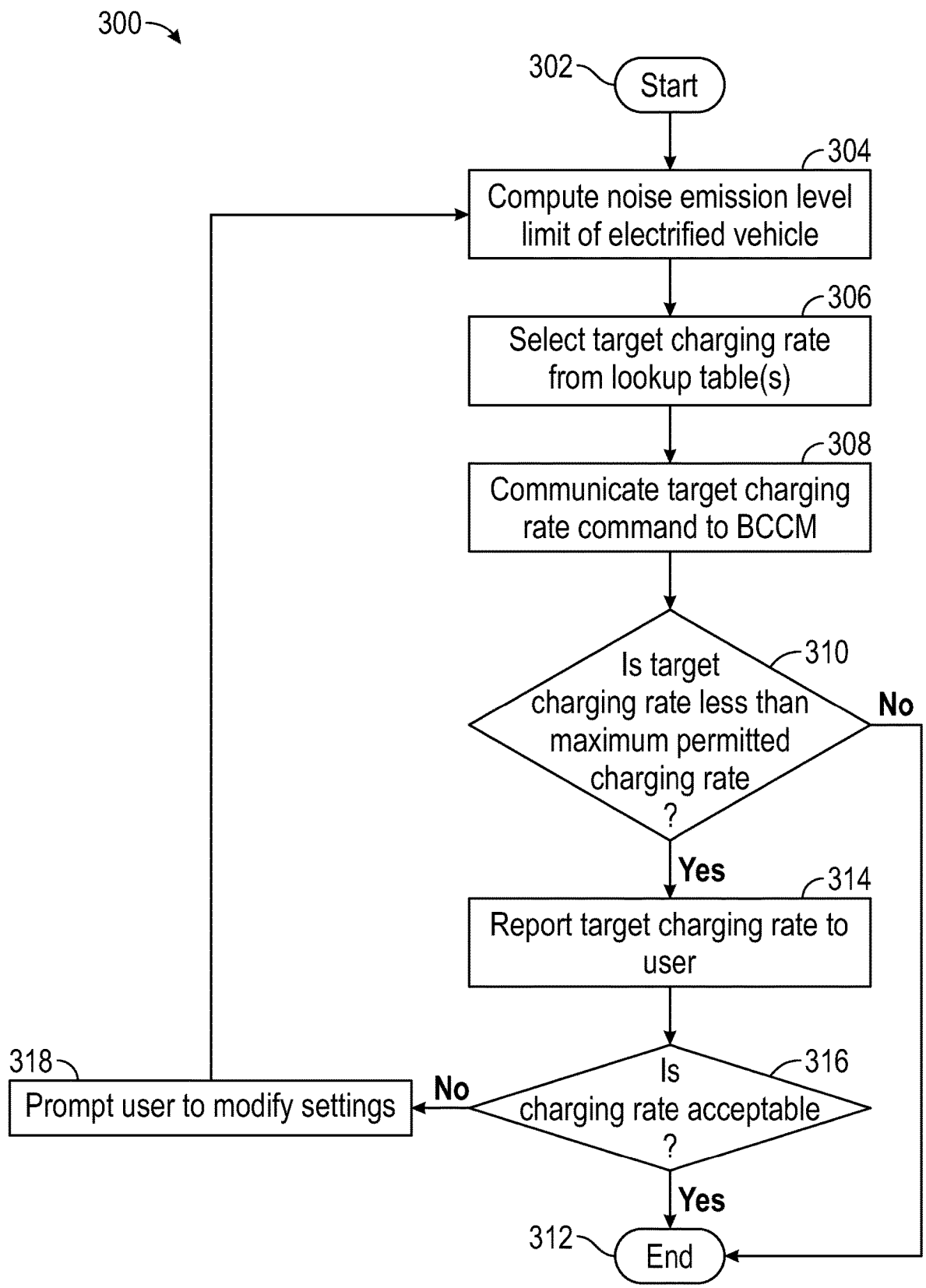
FIG. 6 schematically illustrates another exemplary method for controlling an electrified vehicle in a quiet charging mode for reducing noise emission levels during a charging event.

FIG. 6, with continued reference to FIGS. 1-4, schematically illustrates another exemplary method 300 for controlling noise emission levels (e.g., by executing the quiet charging mode) when charging the electrified vehicle 10. The method 300 may include a greater or fewer number of steps than recited below, and the exact order of the steps is not intended to limit this disclosure. The charging control system 34 may be configured to employ one or more algorithms adapted to execute at least a portion of the steps of the exemplary method 300. For example, the method 300 may be stored as executable instructions in the memory 80 of the control module 42, and the executable instructions may be embodied within any computer readable medium that can be executed by the processor 78 of the control module 42.

The method 300 may begin at block 302. Notably, the method 300 assumes that the electrified vehicle 10 is located within a designated quiet zone and that a charging event has been confirmed or has been inferred as being likely to soon occur.

At block 304, the method 300 may compute the noise emission level limit of the electrified vehicle 10 that is desired during the charging event. The noise emission level limit may be derived based on the GPS data 76 (e.g., current location of the electrified vehicle 10, time of day, day of week, etc.), the noise restriction information 74 received from the servers 66, and the user information 72 (e.g., user specified noise limit selections, customized quiet zone designations, etc.) received from the HMI 36 and/or the personal electronic device 50, for example. In an embodiment, the user information 72 received by the control module 42 may be at least partially derived from data that is entered within the user interfaces 86, 108.

Next, a block 306, the method 300 may select a target charging rate from one or more look-up tables stored in the memory 80 of the control module 42. In an embodiment, the look-up table may correlate the target charging rate to each of the noise emission level limit and a current ambient temperature. The look-up table may further indicate the appropriate operating speeds limits of the sound generating components 82 that are best suited for the selected target charging rate. The method 300 may subsequently communicate a target charging rate command signal to the BCCM 84 at block 308.

At block 310, the method 300 may determine whether the target charging rate is less than a maximum charging rate permitted by the BCCM 84. If a NO flag is returned at block 310, the method 300 may end at block 312.

Alternatively, if a YES flag is returned at block 310, the method 300 may report the target charging rate to the user at block 314. The method 300 may then proceed to block 316 by prompting the user to confirm that the target charging rate is acceptable. If NO, the method 300 may prompt the user to modify the quiet zone mode settings at block 318. The method 300 may then return to block 304. Alternatively, if a YES flag is returned at block 316, the method 200 may end at block 312.

The charging control systems of this disclosure are designed to provide a user with the ability to balance charging rate with noise emission levels when charging an electrified vehicle. The proposed systems/methods are designed to provide increased customer satisfaction by making users more aware of relevant noise restrictions when charging their vehicles and by providing the ability to specifically define individualized noise sensitive areas.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charging control system for an electrified vehicle, comprising:
   a traction battery pack;
   a control module programmed to selectively control charging of the traction battery pack in a quiet charging mode when the electrified vehicle is located in a user-defined custom quiet zone; and
   a user interface operably connected to the control module and configured to permit a user to (1) select a location of the user-defined custom quiet zone within a map of the user interface, and (2) select a loudness tolerance for charging the electrified vehicle when located in the user-defined custom quiet zone.

2. The charging control system as recited in claim 1, wherein the user-defined custom quiet zone identifies a day of a week and a time of the day when the quiet charging mode should be performed.

3. The charging control system as recited in claim 1, wherein the control module is further programmed to compute a noise emission level limit of the electrified vehicle based at least on the user-defined custom quiet zone.

4. The charging control system as recited in claim 3, wherein the control module is further programmed to compute an operating speed limit of a sound generating component of the electrified vehicle based at least on the noise emission level limit.

5. The charging control system as recited in claim 4, wherein the control module is further programmed to determine whether the operating speed limit is sufficient to meet a waste heat dissipation requirement of the traction battery pack.

6. The charging control system as recited in claim 5, wherein the control module is further programmed to modify a target charging rate of the traction battery pack when the operating speed limit is not sufficient to meet the waste heat dissipation requirement of the traction battery pack.

7. The charging control system as recited in claim 3, wherein the control module is further programmed to select a target charging rate for charging the traction battery pack from a look-up table based at least on the noise emission level limit.

8. The charging control system as recited in claim 7, wherein the control module is further programmed to communicate a target charging rate command signal to a battery charge control module (BCCM) of the charging control system.

9. The charging control system as recited in claim 1, wherein the user interface includes a loudness bar having a loudness pointer that is movable along a length of the loudness bar to allow the user to select the loudness tolerance.

10. The charging control system as recited in claim 9, wherein the loudness bar includes a plurality of loudness symbols that visually distinguish between varying levels of loudness, and each loudness symbol of the plurality of loudness symbols indicates the loudness tolerance with respect to a common user experience.

11. The charging control system as recited in claim 1, wherein the user interface includes a second custom quiet zone indicated on the map, and the second custom quiet zone is an area indicated on the map that is selected by a second user of a second electrified vehicle that is different from the electrified vehicle.

12. A charging control system for an electrified vehicle, comprising:
  a traction battery pack;
  a sound generating component configured to dissipate waste heat generated by the traction battery pack; and
  a control module programmed to command a reduced charging rate for charging the traction battery pack when a noise emission level expected to be emitted by the electrified vehicle during a charging event will exceed a noise emission level limit,
  wherein the noise emission level limit is at least partially derived from a user-defined loudness tolerance,
  wherein the control module is further programmed to compute an operating speed limit of the sound generating component of the electrified vehicle based at least on the noise emission level limit,
  wherein the traction battery pack, the control module, and the sound generating component are each on-board components of the electrified vehicle.

13. The charging control system as recited in claim 12, wherein the control module is programmed to command a battery charge control module (BCCM) of the charging control system to apply the reduced charging rate during the charging event.

14. The charging control system as recited in claim 12, wherein the user-defined loudness tolerance is a rule associated with a custom quiet zone.

15. The charging control system as recited in claim 12, wherein the user-defined loudness tolerance is derived from information that is input into a user interface that is operably connected to the control module.

16. The charging control system as recited in claim 12, wherein the control module is further programmed to determine whether the operating speed limit is sufficient to meet a waste heat dissipation requirement of the traction battery pack.

17. The charging control system as recited in claim 16, wherein the control module is further programmed to reduce the charging rate when the operating speed limit is not sufficient to meet the waste heat dissipation requirement of the traction battery pack.

18. The charging control system as recited in claim 12, wherein the sound generating component is a compressor, a pump, or a charge conversion electronics device of the electrified vehicle.

19. The charging control system as recited in claim 12, wherein the sound generating component is a plurality of sound generating components that include at least fan, a compressor, a pump, and a charge conversion electronics device of the electrified vehicle.

20. A method for controlling noise emission levels when charging an electrified vehicle, comprising:
  receiving, at a user interface that is operably connected to the electrified vehicle, a user-defined custom quiet zone that includes (1) a location of the user-defined custom quiet zone as selected within a map of the user interface, and (2) a loudness tolerance for charging the electrified vehicle when located in the user-defined custom quiet zone; and
  controlling charging of a traction battery pack of an electrified vehicle in a quiet charging mode when the electrified vehicle is located in the user-defined custom quiet zone,
  wherein the controlling is performed by a control module of a charging control system of the electrified vehicle.

* * * * *